Dec. 19, 1967   M. J. VETTA   3,358,618
DISPENSING DEVICE
Filed Feb. 19, 1965   5 Sheets-Sheet 1

FIG. I

INVENTOR.
MARIO J. VETTA
BY
RONALD E. BARRY
ATTORNEY

Dec. 19, 1967 M. J. VETTA 3,358,618
DISPENSING DEVICE
Filed Feb. 19, 1965 5 Sheets-Sheet 2

INVENTOR.
MARIO J. VETTA
BY
RONALD E. BARRY
ATTORNEY

Dec. 19, 1967    M. J. VETTA    3,358,618
DISPENSING DEVICE
Filed Feb. 19, 1965    5 Sheets-Sheet 3
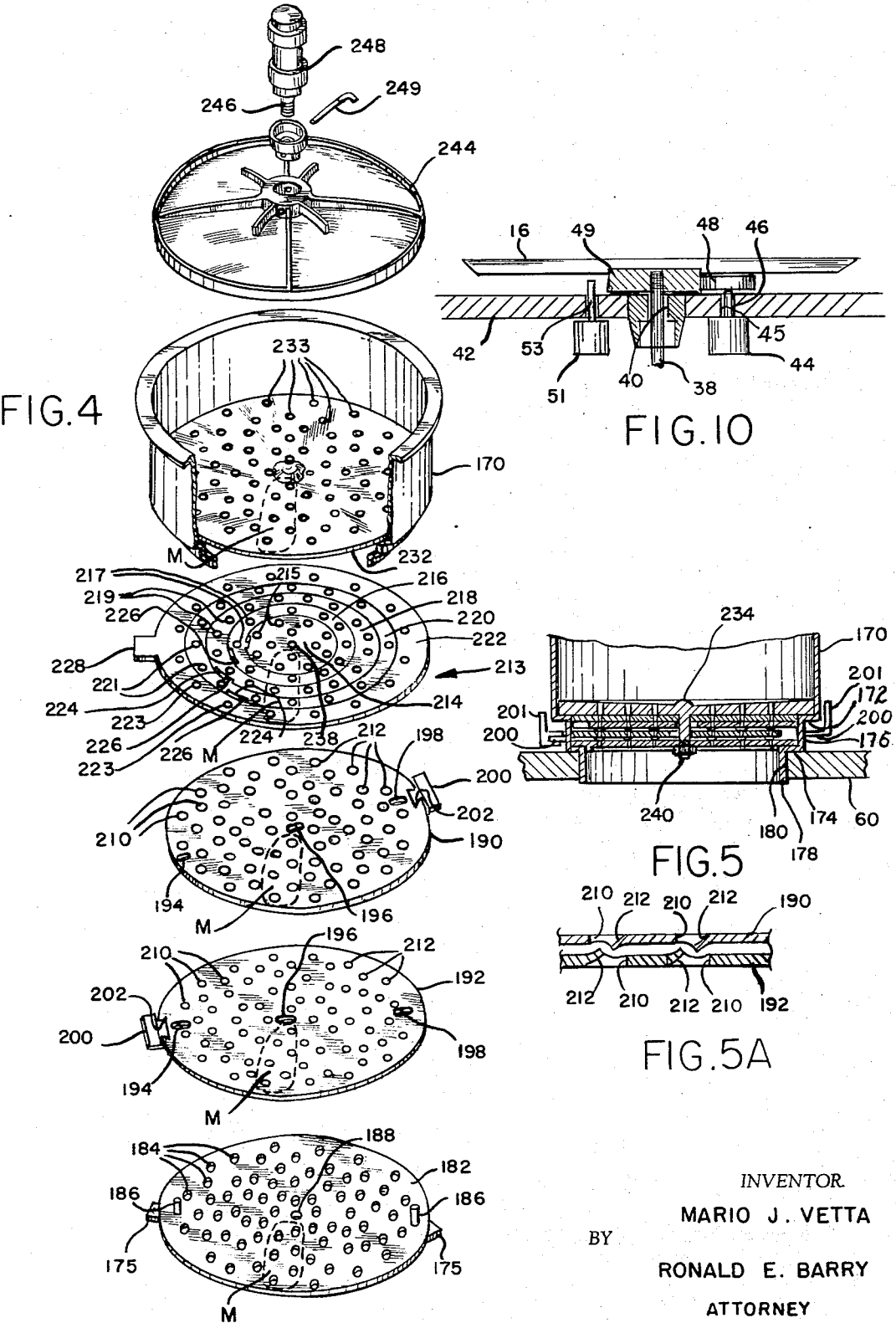
INVENTOR.
MARIO J. VETTA
BY
RONALD E. BARRY
ATTORNEY Dec. 19, 1967 M. J. VETTA 3,358,618
DISPENSING DEVICE
Filed Feb. 19, 1965 5 Sheets-Sheet 4
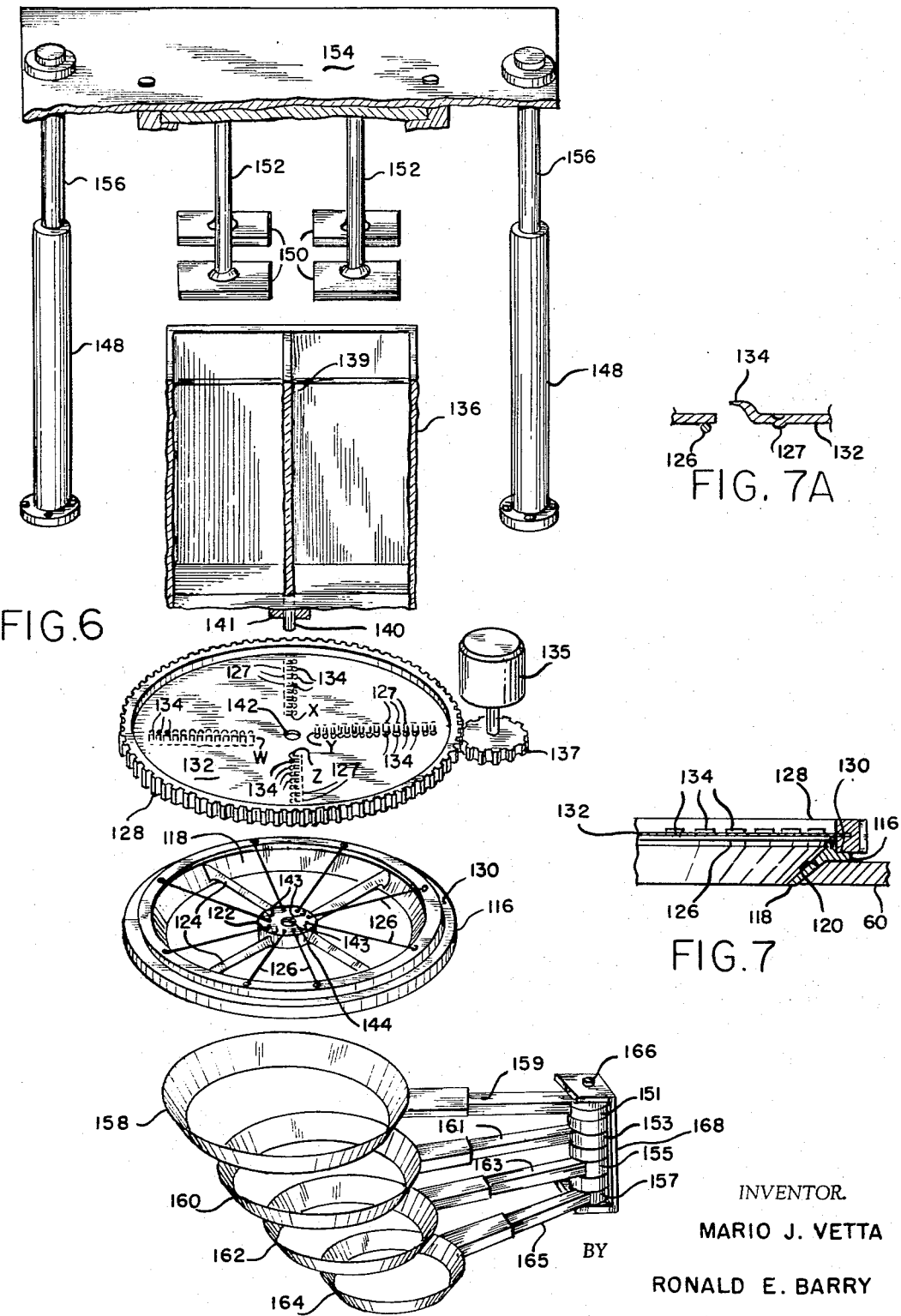
INVENTOR.
MARIO J. VETTA
BY
RONALD E. BARRY
ATTORNEY Dec. 19, 1967  M. J. VETTA  3,358,618
DISPENSING DEVICE
Filed Feb. 19, 1965  5 Sheets-Sheet 5

INVENTOR.
MARIO J. VETTA
BY
RONALD E. BARRY
ATTORNEY

United States Patent Office 3,358,618
Patented Dec. 19, 1967

3,358,618
DISPENSING DEVICE
Mario J. Vetta, 123 W. Broadway,
Waukesha, Wis. 53186
Filed Feb. 19, 1965, Ser. No. 433,925
16 Claims. (Cl. 107—1)

This invention relates to a device for automatically dispensing a number of different ingredients used in making a food product, and more specifically to the ingredients which are added to the body of dough used for making pizza.

The preparation of pizza as is well known is generally done by hand and requires the preparation of a circular flat body of dough which is covered with layers of sauce, cheese and sausage. The body of dough is prepared by forming it to a flat circular shape and the layers of sauce, cheese and sausage are spread on the top of the dough. This requires a considerable amount of time and skill, particularly in the application of the layers of sauce, cheese and sausage to ensure that the proper proportions are applied to the dough. The pizza dough is made and sold in a variety of sizes, further complicating the requirements for an automatic dispensing machine.

One of the primary objects of the present invention is to provide an apparatus for automatically applying the layers of sauce, cheese and sausage to the body of dough which is used in making a pizza.

Another object of the present invention is to provide a dispensing apparatus for applying the layers of sauce, cheese and sausage to the pizza dough, which is selectively adjustable to various size pizzas.

Another object of the present invention is to provide an improved dispensing apparatus for applying sauce, cheese and sausage to pizza dough which automatically adjusts the amount of sauce, cheese and sausage according to the indicated size of the pizza dough.

Another object of the present invention is to provide an improved dispenser for the sauce commonly used in a pizza which automatically adjusts to the proper size and dispenses the required amount in a pattern that is equal in size to the indicated size of the pizza dough.

Still another object of the present invention is to provide an improved dispenser for a solid ingredient, such as sausage, for a pizza, which automatically adjusts to the proper size of pattern and amount dispensed in response to the indicated size of the pizza dough.

A further object of the present invention is to provide an improved dispenser for dispensing cheese to be used in a pizza, which ensures complete cut off of the cheese in a pattern that is equal in size to the indicated size of the pizza dough.

A further object of the present invention is to combine an improved sausage dispenser, sauce dispenser and cheese dispenser with a rotary table for automatically moving a prepared body of dough beneath the dispensers in a timed sequence.

A still further object of the present invention is to provide improved sauce, cheese and sausage dispensers for a semi-automatic pizza machine that can be easily assembled and disassembled for complete cleaning.

A still further object of the present invention is to provide a semi-automatic dispensing machine which also maintains the ingredients in a refrigerated condition.

These objects are accomplished by mounting a sauce dispenser, a cheese dispenser and a sausage dispenser within a refrigerated cabinet with their vertical axes being located equidistant apart and on the periphery of a common circle. A turntable is positioned to rotate on the axis of the common circle in a step by step manner beneath the dispensers to automatically move the pizza dough from one dispenser to the next. After the pizza dough has moved through a complete cycle, it is removed from the machine and placed in an oven or quick frozen.

Other objects and advantages will become more apparent from the following detailed description when read in connection with the accompanying drawings, in which:

FIG. 4 is an exploded view of the sausage dispenser.

FIG. 5 is an enlarged sectional view showing the cooperation between the plates of the sausage dispenser.

FIG. 5A is an enlarged view of the cutter teeth.

FIG. 6 is an exploded view of the cheese dispenser.

FIG. 7 is an enlarged view showing the cooperation between the grating plate and the cut off wires.

FIG. 7A is an enlarged view of the cut off wire below the grating plate.

FIG. 10 is a side sectional view of the drive system for the turntable.

Figure 1:
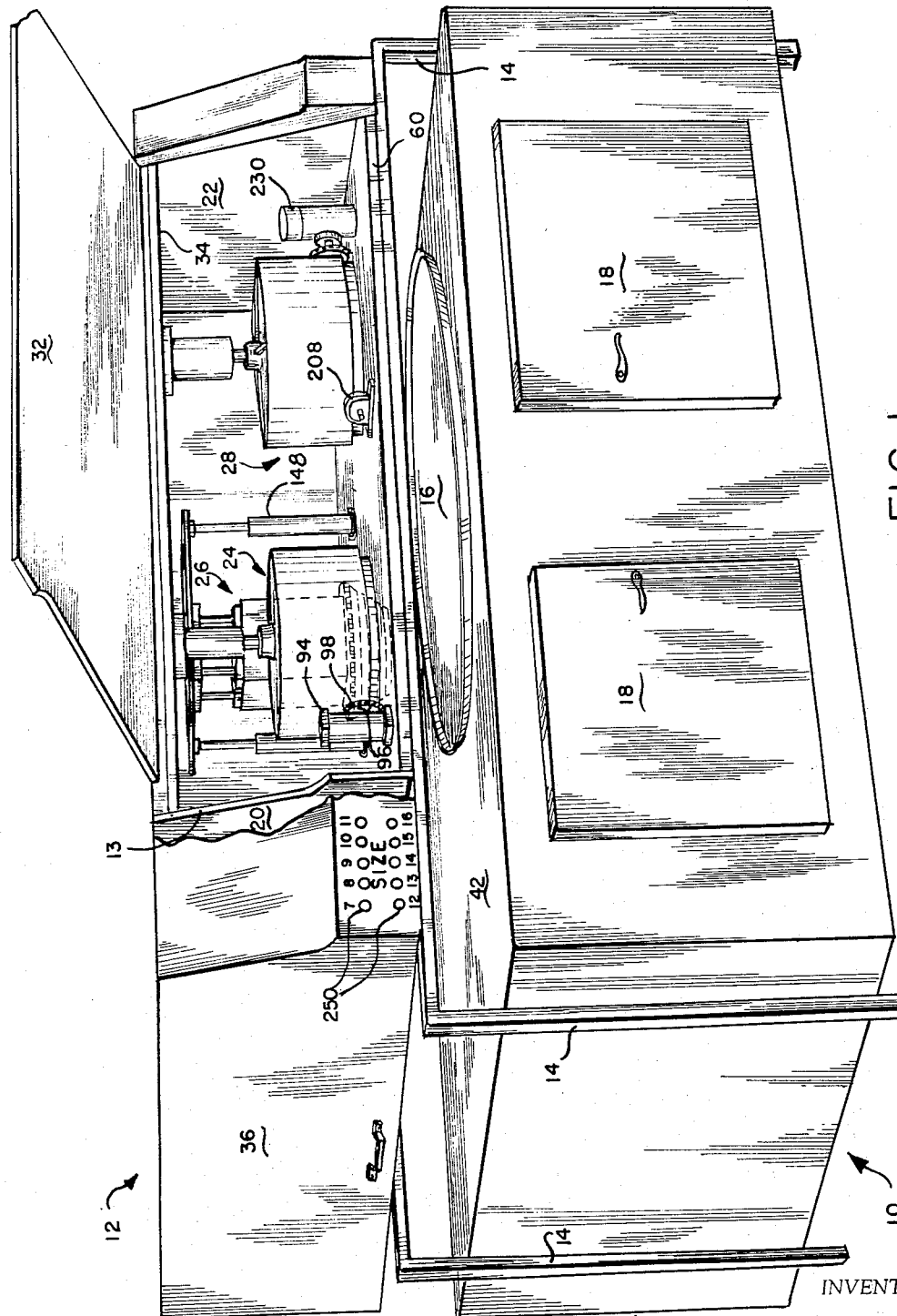
FIG. 1 is a projected view of the cabinet with the front door open to show the position of the sauce, cheese and sausage dispensers.

Referring more particularly to the drawings, the semi-automatic dispensing apparatus includes a lower cabinet 10 and an upper cabinet 12 supported by frame members 14 by any appropriate means. The lower cabinet has a turntable 16 mounted for rotation on its upper panel 42 and a pair of doors 18 in its front panel so that the lower cabinet can be used as a refrigerated storage space for sauce, cheese and/or sausage. The upper cabinet 12 is divided by a vertical panel 13 into a control compartment 20 and a dispensing compartment 22. A sauce dispenser 24, cheese dispenser 26 and sausage dispenser 28 are mounted in the dispensing compartment in position to drop sauce, cheese or sausage onto the turntable in predetermined patterns. The dispensers are located above the turntable with their vertical axes equidistant from the axis of the turntable and spaced 120° apart. A door 32 is hingedly connected to the front edge of top panel 34 to open the dispensing compartment in the cabinet for cleaning and filling the dispensers. The compartment may also be refrigerated if desired. A side door 36 is hingedly connected to the side edge of the top panel for opening the control compartment to service the control circuits.

Turntable 16 is mounted on a shaft 38 which extends through an aperture 40 in a bearing in upper panel 42 of the lower cabinet and is journalled for rotation therein. A motor 44 is mounted on the underside of the upper panel within the lower cabinet with drive shaft 46 extending upward through aperture 45 in the upper panel. A friction drive wheel 48 is secured to the motor shaft and frictionally engages a friction-driven wheel 49 secured to shaft 38 below the turntable. The motor is energized intermittently to rotate the turntable approximately 120° at a time in a step by step manner from one dispenser to the next. Control of the operation of the motor is accomplished by control circuits in said control compartments which are well known. Since the pizza dough must be stopped exactly below the dispensers, a solenoid 51 is secured to the underside of the upper panel with armature 53 positioned to be moved into engagement with the bottom of turntable 16. Stops (not shown) are provided on the bottom of the turntable to engage the armature whenever the turntable has been rotated far enough to bring the pizza dough under the dispenser. A number of roller bearings (not shown) are provided beneath the turntable at its outer periphery to hold the turntable in a horizontal position.

Sauce dispenser 24 includes a cylindrical open-ended reservoir or pot 50 having inwardly extending flanges 52 and 54 connected to wall sections 56 and 58. The pot is mounted on bottom panel 60 of the upper cabinet by inserting wall sections 58 through hole 62 with flange 54 resting on the top surface of the bottom panel. A sizing plate 64 is positioned in the pot with its outer edge resting on flange 54 and its actuating arm 66 extending through a slot in wall section 56. A dispensing plate 70 placed on top of the sizing plate with its actuating arm 72 also extending through the slot in the wall section 56. A cut-off plate 74 having a central hub 76 and arms 78 connected to outer ring 80 is placed on the dispensing plate with the outer ring resting on flange 52. The plates are held together by a bolt 68 which projects through apertures 53, 55 and 57 in the plates and is held in position by nut 69. The plates are sealed by annular ridges 82 and 84 on the bottom of plates 74 and 70, respectively, which fit into grooves 86 and 88 on the top of plates 70 and 64, respectively. A snap on bracket 90 is connected to arm 66 on plate 64 after it has been inserted through the slot of the wall section 56 and is provided with a series of holes 92, that are used to rotate the sizing plate within the pot. The sizing plate is moved by a reversible motor 94 mounted on the bottom panel 60 which drives a wheel 96 having a number of pins 98 positioned to engage holes 92. A bracket 100 is snapped into actuating arm 72 and supports a solenoid 102 which when energized moves armature 101 into engagement with one of a series of holes (not shown) provided in plate 90 to interlock the two plates when the sizing plate has been properly positioned. Both plates will then move together as explained below.

Figures 2, 3:
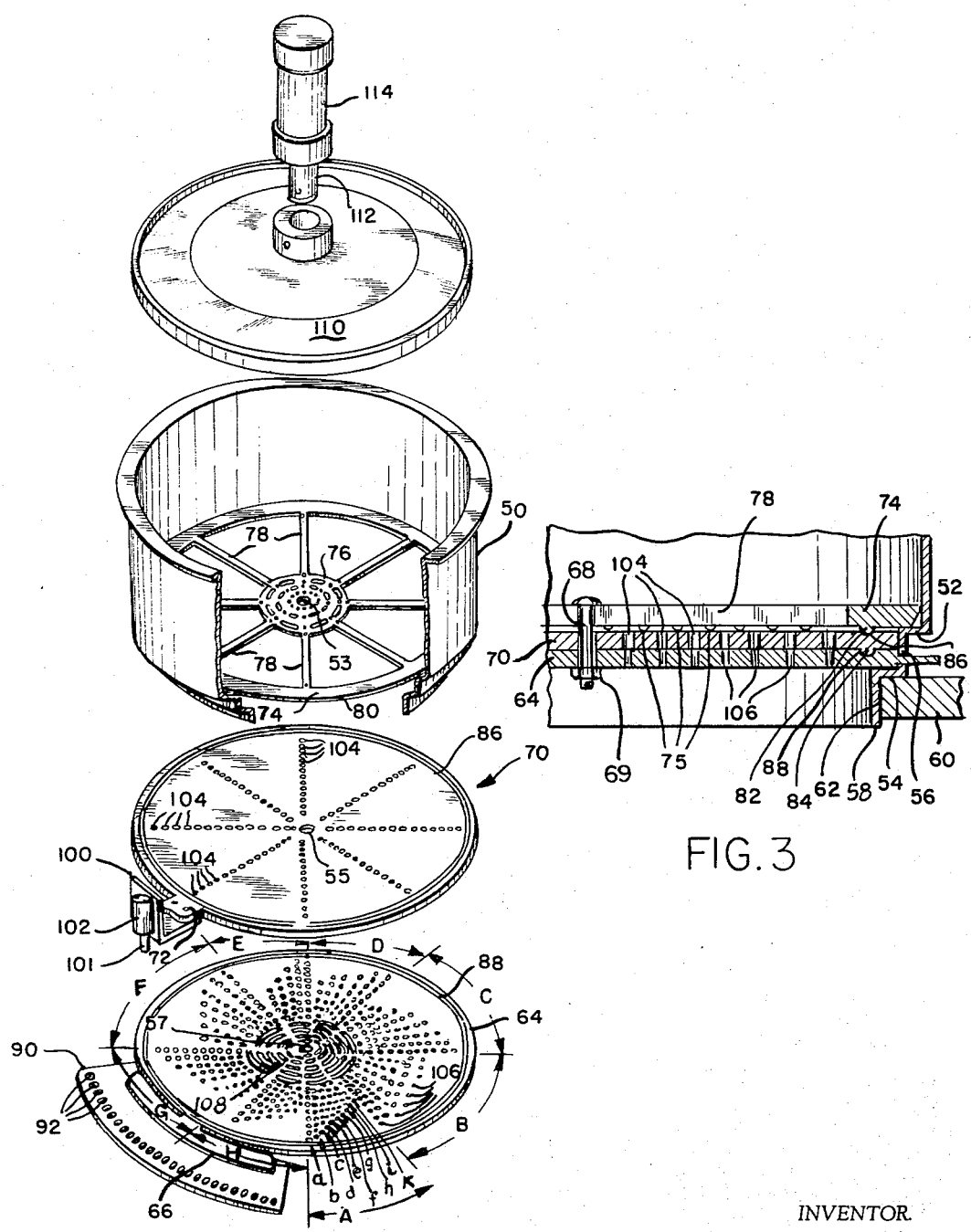
FIG. 2 is an exploded view of the sauce dispenser.
FIG. 3 is an enlarged view showing the cooperation between the arms of the cut off plate and the sizing and dispensing plates.
Figure 8:
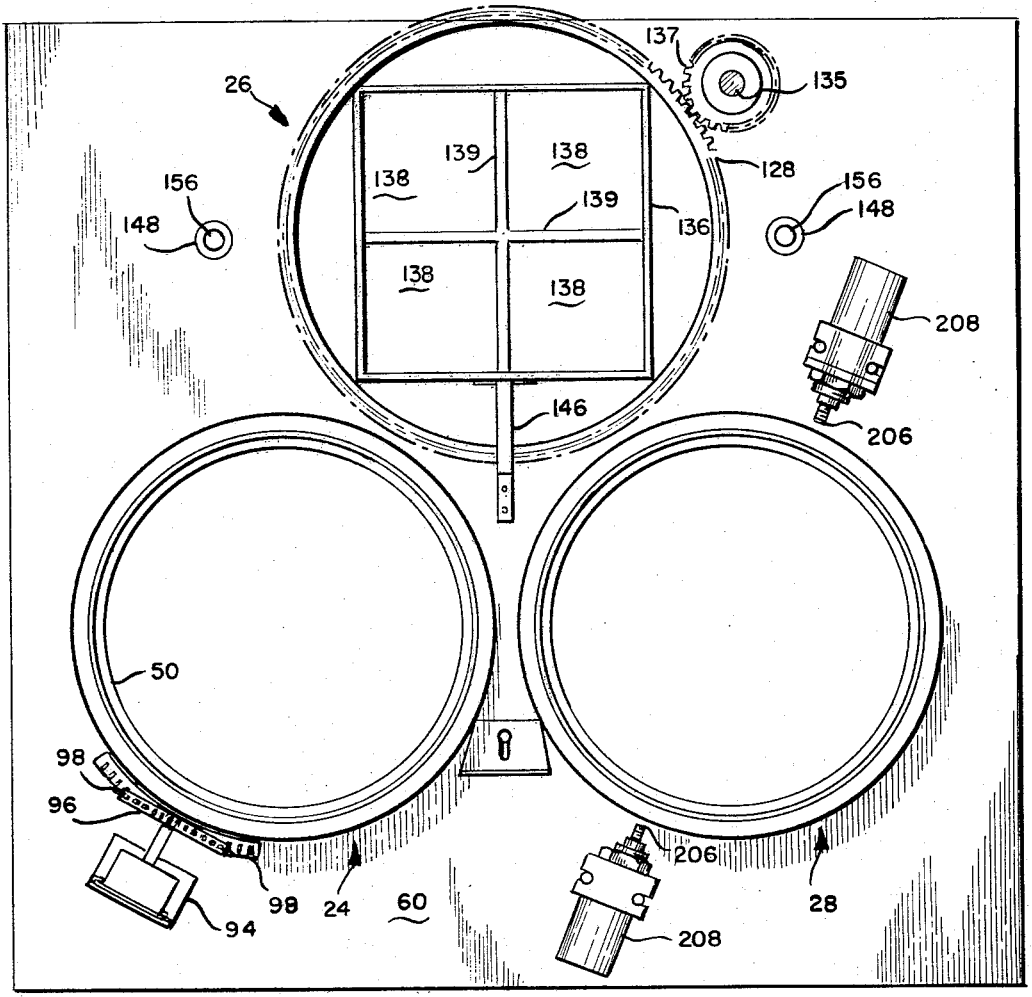
FIG. 8 is a top view of the upper cabinet with the top panel removed to show the position of the dispensers.
Figure 9:
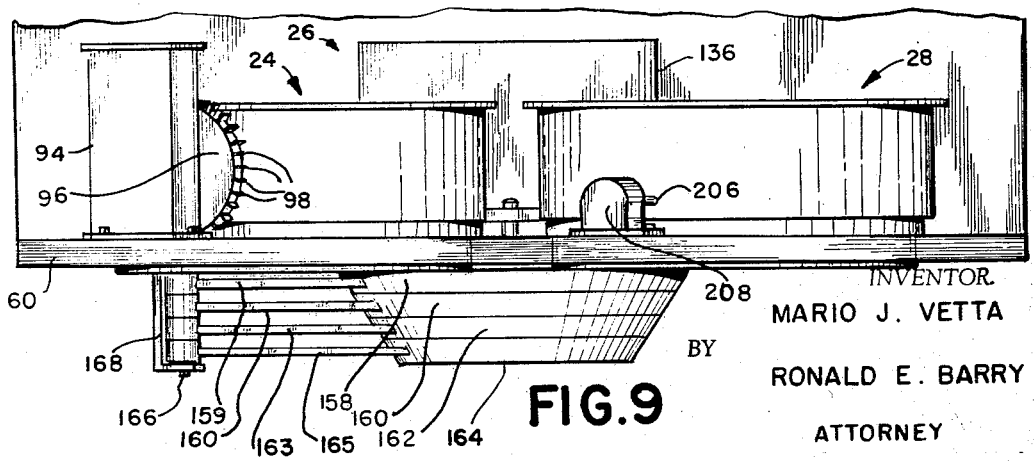
FIG. 9 is a front view of the upper cabinet showing the position of the dispensers.

It will be noted in FIG. 2 that dispensing plate 70 has a number of rows of holes 104, fourteen in each row, which extend radially outward from the center of the plate. The angular relation of the holes is the same as the angular relation of the arms in cut off plate 74 and in the drawings eight arms and eight rows of holes are shown. In the neutral or shut off position the lines of holes 104 are aligned with the arms, closing the holes to prevent the flow of sauce from the pot. A row of beads 75 is provided on the bottom of each arm which corresponds to the rows of holes in the dispensing plate to seal the holes 104 when aligned under the arms. The number of holes 104 which are opened will determine the amount of sauce which is dispensed and also the diameter of the pattern of sauce. Sizing plate 64 is used to control the number of holes 104 that are opened and is provided with patterns A, B, C, D, E, F, G and H of holes 106 and slots 108 for each row of holes 104.

For purposes of description, only the pattern of holes and slots marked A in FIG. 2 will be described since the other sections are exactly the same. It should be noted that fourteen holes are shown in each row of holes 104 in the dispensing plate. In pattern A it should also be noted that there are nine holes and five slots in line $a$, eight holes and five slots in line $b$, seven holes and five slots in line $c$, six holes and five slots in line $d$, etc., down to line $k$ which has five holes and five slots only. The smallest pizza contemplated in this invention is a 7" diameter pizza; therefore, the five slots are always open. For each one inch increase in size a hole 106 is added. The slots are positioned to correspond to the first five holes in each row of holes 104 and the holes 106 to the remaining holes in each row. In the shut off or neutral position of the sizing plate, line $a$ will be aligned with the rows of holes 104. When line $a$ of the sizing plate is aligned with the lines of holes 104 in the dispensing plate, all of the holes will be open and sauce will flow through all nine holes and five slots. As each of the lines, $b$, $c$, $d$, etc., is aligned with the line of holes in the dispensing plate, a correspondingly smaller number of holes will be opened and thus a smaller pattern and amount of sauce will be dispensed. To make the adjustment from line $a$ to a smaller size pizza, the sizing plate is rotated clockwise (FIG. 2) relative to the dispensing plate which is held in a stationary position. The two plates are then locked together and rotated simultaneously counter clockwise through 45° of travel and returned to the neutral position. In order to assure the proper flow of sauce, a pressure plate 110 is positioned in the top of the pot and is supported on the end of a piston rod 112 of double acting hydraulically actuated piston and cylinder 114 which is secured to the underside of top panel 34 by any conventional means. Whenever sauce is to be dispensed, the hydraulic cylinder will be pressurized to move the piston downward and apply pressure to the pressure plate.

The cheese dispenser 26 includes a stationary support ring 116 which has a lower truncated section 118 that is inserted into hole 120 in bottom panel 60 of the upper cabinet (FIG. 7). The ring is secured from rotation but can be lifted out of hole 120. The support ring is provided with a central hub 122 which is supported within the ring by arms 124 with a number of wires 126 connected to the ring and hub at equally spaced intervals. A ring gear 128 is positioned for rotation on flange 130 of the support ring and supports a grating plate 132 for rotation just above the wires 126. Four rows, $w$, $x$, $y$ and $z$ of cutter teeth 134 are provided in the grating plate with the teeth in rows $w$ and $y$ being located at distances from the center of the plate equal to the distance between the teeth in rows $x$ and $z$. Whenever the grating plate is rotated, each alternate row will engage a different portion of the cheese. The cheese that is grated by the cutter teeth extends below the grating plate unless it is cut off below the plate. A line of small beads 127 (FIG. 7A) is provided in the grating plate behind each tooth which will engage the wire 126, cutting off the cheese. A motor 135 is mounted on the bottom panel and drives gear 137 to rotate the ring gear and grating plate.

A square reservoir or pot 136 which is divided into quadrants 138 by walls 139 is secured to a shaft 140 that extends through aperture 142 in the grating plate and is seated in aperture 144 in hub 122. Support brackets 146 are provided on each side of the reservoir to hold it from rotating with the grating plate. A center section 141 on the bottom of the reservoir rides on the top of the grating plate and dimples 143 are provided on the hub to support the center of the grating plate. When the cheese is placed in each of the quadrants it will rest on the grating plate and as the plate is rotated, the cutter teeth will grate the cheese from its lower end. Pressure is applied to the cheese by pressure plates 150 which are supported on shafts 152 on crosshead 154 which is suspended between piston rods 156 on double acting cylinders 148.

The cheese must be dropped in a pattern having a predetermined diameter which is slightly less than the diameter of the pizza dough. A number of sizing hoppers 158, 160, 162 and 164 are used to control this pattern and have outwardly extending arms 159, 161, 163 and 165, respectively, mounted on a shaft 166. The shaft is secured to the bottom of the bottom panel by bracket 168, and projects upward through the bottom panel into the dispensing compartment. The shaft is rotated through one half revolution and back by a reversible motor (not shown) to move one or more of the hoppers under the cheese dispenser. The end of each arm which is mounted on the shaft is provided with an electrically actuated magnetic clutch 151, 153, 155 and 157. When the size of the pizza dough is indicated in the system, the clutch in the arm corresponding to the indicated size of pizza dough as well as the clutches in the arms of any hoppers larger than the indicated size will be energized, locking the arm or arms to shaft 166. When the shaft is rotated, the hoppers connected to the energized clutches will be rotated to a position under the dispenser. Each time a new size is selected, all of the hoppers are returned to the initial position and a different set of clutches are energized.

The sausage dispenser also includes a cylindrical open-ended pot 170 having inwardly extending flanges 172 and 174 connected to wall sections 176 and 178. The lower wall section 178 is positioned in hole 180 in the bottom panel 60 with flange 174 resting on the upper surface of the bottom panel. A support plate 182 is positioned in the pot with its outer edges resting on flange 174 and is secured from rotation by the engagement of tabs 175 with grooves in wall section 176. The support plate is perforated with a number of elliptical holes 184 and has a pair of upwardly extending pins 186 on its upper surface located on diametrically opposite sides of central aperture 188. The longitudinal axis of each of the holes should be substantially parallel with a line drawn through the two pins. First and second cutter plates 190 and 192 are placed on top of the support plate. Each plate has three slots 194 and 196 and 198 which are aligned on a common diameter. The pins 186 on the support plate will extend upward through slots 194 and 198 in the cutter plates, terminating just short of the top surface of the first cutter plate. Actuating brackets 200 are secured to notches 202 in the edges of the plates, and extend out through a slot in wall section 176. Connecting brackets 201 are secured to the actuating brackets after they have been inserted through the slots and are in turn connected to piston rods 206 in double acting pneumatic cylinders 208. The cutter plates are moved in equal but opposite directions simultaneously by the pneumatic cylinders and are guided in their travel by pins 186. Each of plates 190 and 192 has a number of holes 210 having a cutting edge 212 on one side to cut any sausage that is forced into the holes. It should be obvious that holes 210 are aligned with elliptical holes 184 in the support plates (as seen in FIG. 5). Referring to FIG. 5A an enlarged view of the cutting teeth is shown. The cutting edges 212 on plate 190 are bent downward while the cutting edges 212 on plate 192 are bent upward. Since the cutting edges are formed from the holes 210 they will have arcuate cutting surfaces.

When the plates are reciprocated, these surfaces will ride up on each other, cutting off any sausage that has been forced through the holes.

The amount and size of the pattern of sausage that is to be dropped on the dough is controlled by sizing plate 213 which is placed on top of the cutter plates. The sizing plate is made up of a center piece 214 and a series of rings 216, 218, 220 and 222. The center piece and rings are each provided with a series of holes 215, 217, 219, 221 and 223, respectively. The center piece and the first three rings have a slot 224 on their outer periphery and all of the rings have a tab 226 on their inner periphery which is aligned in the slot in the adjacent ring. Referring to FIG. 4, it will be noted that when the outer ring 222 is rotated clockwise, it will rotate independently until tab 226 reaches the end of slot 224 in ring 220. Both rings will then rotate together until tab 226 in ring 220 reaches the end of slot 224 in ring 218. The same will be true for succeedingly smaller rings. An actuating arm 228 is provided on the outer edge of ring 222 which projects through a slot in wall section 176 of the pot to make this movement. The adjustment can be made either by a motor 230 and pin wheel as shown (FIG. 1) or by a pneumatic cylinder which is connected to the actuating arm.

Finally, a bottom plate 232 is placed in the pot with its outer edge resting on flange 172. The bottom plate has a dish-shaped upper surface and a number of holes 233 equal to the number of holes in the sizing plate. A bolt or pin 234 extends downward from the center of plate 232, through aperture 238 in center piece 214, slots 196 in the cutter plates and aperture 188 in the support plate with a nut 240 screwed onto the end of the bolt to hold the plates together. When these plates are initially assembled, the holes in each of the plates will be aligned. In describing the alignment of these holes, only the holes in the outer circles or patterns marked M in each plate will be considered. Moving the outer sizing ring clockwise will move holes 223 in the ring out of alignment with the corresponding holes 233 in pattern M so that the sausage in these holes cannot pass through the sizing plate. As each succeedingly smaller ring is moved out of alignment, the amount and pattern of sausage to be dispersed from the dispenser will become smaller. The sausage which is too thick to flow through the holes 233 is squeezed against the bottom plate by pressure plate 244 mounted in the top of the pot. The pressure plate is secured to the end of piston rod 246 in double acting cylinder 248 by a pin 249. The cylinder is secured to the top panel by any conventional means. Pressure is applied to the sausage to force the sausage through the holes that are aligned with the holes in the rings. The cutter plates are then actuated to cut off the sausage in the holes.

In operation, the pizza dough is placed on a board or paddle which is placed on the turntable beneath the sauce dispenser. Alignment pins are provided on the turntable at three equally spaced locations on the turntable to assure proper positioning of the pizza dough. The operator then pushes one of the buttons 250 on the control compartment which indicates the size of pizza placed on the turntable. Each of the buttons is marked with the size of the pizza in inches and is connected to the circuits controlling the size mechanism for each of the dispensers. Once a button has been selected, each of the dispensers will be simultaneously and automatically adjusted to the proper pattern size as more fully described hereinafter. In the following description it will be assumed that the ten inch button has been selected.

The sizing plate for the sauce dispenser will be rotated until lines of holes and slots in each pattern are aligned with the rows of holes in the dispensing plate. The five slots are always open and the remaining ten holes are opened or closed, depending on whether the pattern is to be seven inches in diameter or sixteen inches in diameter. For a ten inch pattern, line $f$ will be moved into alignment with the rows of holes in the dispensing plate.

There are four cheese hoppers positioned below the bottom panel 60 adjacent to the cheese dispenser. The smallest hopper is used for seven inch and eight inch patterns and each succeedingly larger hopper is used for two pattern sizes or diameters. The pattern for the largest or fifteen inch and sixteen inch pizzas is determined by truncated sections 118 on the support ring. For a ten inch pattern magnetic clutches 151, 153 and 155 for the three largest hoppers will be energized and the shaft 166 rotated one half revolution to align these hoppers under the cheese dispenser. The buttons 250 are connected to the magnetic clutches so that the 7 and 8 inch buttons energize all of the clutches, the 9 and 10 inch buttons, the clutches for the larger hoppers and so on.

The sizing plate for the sausage dispenser operates in somewhat the same manner as the cheese hopper. The center piece controls the pattern for pizzas up to eight inches. For a ten inch pattern, the first or outer ring will be rotated until the second and third rings have been moved far enough to move the holes in the rings out of alignment with the holes in the bottom plate.

Since the sizing for each of the dispensers is done simultaneously, it will take only a few seconds to complete. As soon as the sizing is completed, pressure will be applied to the sauce pressure plate. The dispensing late and sizing plate will be rotated simultaneously through 45° of travel or from one arm to the next arm. The pressure on the dispensing plate is released and the plates are returned to their original position. Sauce will flow through the holes in the dispensing plate that are aligned with the holes and slots of the sizing plate during the initial motion of the two plates but only a limited amount will flow during the return motion because of the reduction in pressure.

Upon completion of the dispensing of the sauce, the motor for the turntable will be energized and the solenoid energized to withdraw the armature from engagement with the bottom of the turntable. The turntable will be turned 120° or until the pizza dough is approximately under the cheese dispenser. The motor will be de-energized as well as the solenoid which allows the armature to move up and engage the turntable, stopping the turntable with the pizza dough under the cheese dispenser.

The pressure plates for the cheese dispenser will be moved downward to pressurize the cheese and drive motor 135 for the ring gear will be energized to rotate the grating plate. As cheese is grated through the cutters it will be cut off by the wires on the support ring. The hoppers will catch the grated cheese and funnel it to the desired pattern. The amount of cheese which is grated will depend on how many degrees of revolution of motion are imparted to the grating plate. This will be automatically established in the motor circuit according to the size of the pattern that is being dispensed.

Upon completion of the cheese dispensing operation, the turntable will again be rotated 120° by the drive motor to move the pizza under the sausage dispenser and will be stopped upon de-energizing the solenoid. The pressure plate for the sausage will be brought downward to force the sausage through the holes in the bottom late that are aligned with holes in the sizing plate. The cutter plates will be reciprocated approximately three times to cut off the sausage, allowing it to drop on the pizza. The dish shape of the bottom plate assures that the sausage will be forced toward the center of the plate. The completed pizza can then be removed from the turntable.

In this system, a single pizza will be cycled through at a time and upon completion of the cycle, all of the sizing systems will be returned to their initial positions.

The machine has been designed to meet sanitary requirements. Each of the dispensers can be lifted out of the bottom panel and quickly disassembled by merely lifting the plates out of the pots. All of the parts are made out of plastic material which can be quickly and easily washed.

Although only one embodiment of the present invention has been shown and described, it should be apparent that various changes and modifications can be made to the device without departing from the scope of the appended claims.

What is claimed is:

1. An automatic pizza ingredient dispensing apparatus comprising, in combination, a frame, sauce dispensing means supported on said frame, cheese dispensing means supported on said frame, sausage dispensing means supported on said frame, means for conveying the dough for a pizza in a step by step manner from one dispensing means to the next, and control means for actuating said dispensing means in timed sequence to dispense sauce, cheese or sausage when the dough is beneath the corresponding dispensing means, each of the dispensing means including sizing means for restricting the size and the amount of sauce, cheese or sausage which is dispensed to the size and amount required to cover the dough for the pizza which is to be made in the apparatus.

2. A dispensing apparatus according to claim 1 wherein the sauce dispensing means includes a cut off plate having a number of radially extending arms and a dispensing plate having a number of radially extending rows of holes corresponding to the arms, said holes being closed when aligned with the arms and opened when the dispensing plate is rotated relative to the arms.

3. A dispensing apparatus according to claim 2 wherein said sauce dispensing means includes a sizing plate having a pattern of holes for each row of holes in the dispensing plate, each pattern of holes including radially extending lines of holes with each adjacent line having one less hole than the preceding line, whereby the number of holes in the dispensing plate which are open will depend on the line of holes in the sizing plate which is to be aligned with the holes in the dispensing plate.

4. A dispensing apparatus according to claim 1 wherein said cheese dispensing means includes a support ring having a number of wires extending across its upper surface, and a grating plate positioned for rotary motion on said support plate, said grating plate having lines of cutter teeth projecting upwards from said plate, the wires on said support ring cutting off cheese grated through the teeth in the grating plate.

5. A dispensing apparatus according to claim 4 wherein said cheese dispensing means includes a set of truncated sizing hoppers of progressively smaller diameters, said hoppers being positioned below said support ring out of alignment with said support ring, and means for moving the hoppers to restrict the pattern of grated cheese to the size of the pizza dough under the support ring.

6. A dispensing apparatus according to claim 1 wherein said sausage dispensing means includes a pair of cutter plates, each having a number of holes with cutting edges for cutting the sausage that extends through the holes which are aligned between the two plates.

7. A dispensing apparatus according to claim 6 wherein said sausage dispensing means includes a sizing plate having a number of concentric rings positioned around a circular center plate, each ring having a number of holes corresponding to the holes in the cutter plates and having a lost motion connection with the next smaller ring, whereby all of the holes in the rings will be aligned with holes in the cutter plates initially and the holes in the rings will be moved out of alignment with holes in the cutter plates as each ring is rotated relative to the cutter plates.

8. A sauce dispenser comprising
- a cylindrical pot open at both its upper and lower ends and having first and second inwardly extending flanges at its lower end,
- a sizing plate positioned on the second of said flanges and being rotatable thereon,
- a dispensing plate positioned on the sizing plate and being rotatable therewith,
- a cut off plate positioned on the first of said flanges and having a number of radially extending arms, said cut off plate being fixed against rotary motion, said dispensing plate having a number of rows of holes equal to the number of arms, said holes being closed when aligned with said arms, and opened when the dispensing plate is rotated to move the holes out from under the arms, said sizing plate having a pattern of holes for each row of holes in the dispensing plate, each pattern including radially extending lines of holes with each line having one less hole than the adjacent line on one side,
- means for rotating the sizing plate relative to the dispensing plate to align a predetermined line of holes in the pattern with the holes in the dispensing plate, and
- means for interlocking the sizing and dispensing plates whereby on rotation of the interlocked plates sauce will flow through the aligned holes in these two plates.

9. A source dispenser according to claim 8 wherein the arms of said cut off plate include beads on their lower sides which correspond to the holes in the rows of holes in the dispensing plate, whereby said beads will seat in said holes when the dispenser plate is rotated to align the holes with the arms and thereby positively closing the holes in the dispenser plate.

10. A cheese dispenser comprising
- a hopper having a number of equal size chambers,
- a grating plate located beneath the hopper and having rows of upwardly projecting grating teeth equal to the number of chambers in the hopper,
- a support ring located below and supporting the grating plate for rotary motion and having a number of wires extending across the center of said ring in close proximity to the bottom surface of said grating plate, and means for rotating said grating plate to grate cheese located in said hoppers, said wires cutting off the cheese as it is grated through said grating teeth.

11. A cheese dispenser according to claim 10 wherein said grating plate includes a row of downwardly projecting beads which engage said wires to cut off the grated cheese.

12. A cheese dispenser according to claim 10 including a set of sizing hoppers of increasing diameter, said sizing hoppers being mounted on a rotary shaft, and being rotatable into position beneath the support ring to determine the size of the pattern of grated cheese which is dropped from the dispenser.

13. A sausage dispenser comprising an open ended reservoir having upper and lower ends and first and second inwardly extending flanges located on its lower end, a support plate positioned on the second flange and having a number of elliptical holes, a pair of cutter plates positioned in overlapping relation for reciprocal motion on the support plate, said plates having a number of holes located in identical patterns, one edge of the holes in the upper plate being turned downward to form an arcuate cutting edge and an edge of the holes in the lower plate being turned upward to form an arcuate cutting edge, pressure plate means to force the sausage in said reservoir toward the lower end of the reservoir, means for moving the cutter plates in equal and opposite directions so that the cutting edges pass back and forth over each other, cutting any sausage which is forced through the holes, pattern sizing means overlying the cutter plates to determine the holes through which sausage will pass, a cut off plate positioned on said first flange and having a number of holes corresponding to the holes in the cutter plates, and pin means extending through said plates and sizing means to hold the plates together.

14. A sausage dispenser according to claim 13 wherein said pattern sizing means comprises a circular member, a number of concentric ring members including said circular member, each of said members having a number of holes corresponding to the holes in the cutter plates, said rings being independently rotatable and interconnected by a lost motion connection, whereby said rings can be rotated to move the holes in each ring out of alignment with the holes in the cutter plates in sequence to thereby reduce the size of the pattern in steps.

15. A dispensing device comprising a reservoir for a solid food product, rotary cutter means at the bottom of the reservoir for grating the food product, pressure means to force the food product against the cutter means, and pattern sizing means for varying the size of the pattern of food product that is dispensed.

16. A dispensing device comprising a reservoir for a food product, said reservoir having a number of openings in the bottom located in a series of predetermined patterns, sizing means to close the openings in certain of said patterns of openings selectively to create a variable pattern of the food product, and cut off means to cut off the product as it is forced through the unclosed openings in the reservoir bottom.

References Cited

UNITED STATES PATENTS

| | | | |
|---|---|---|---|
| 2,138,716 | 11/1938 | Truitt | 146—61 X |
| 2,190,483 | 2/1940 | Pacilio | 107—1 X |
| 2,489,171 | 11/1949 | Balduf | 222—486 X |
| 3,221,672 | 12/1965 | Falco | 107—1 |

FOREIGN PATENTS

| | | |
|---|---|---|
| 779,458 | 7/1957 | Great Britain. |

WALTER A. SCHEEL, *Primary Examiner.*

J. SHEA, *Assistant Examiner.*